United States Patent [19]

Dauvergne

[11] Patent Number: 4,960,326
[45] Date of Patent: Oct. 2, 1990

[54] LENTICULAR EYEWEAR AND METHOD OF FABRICATION

[76] Inventor: Hector A. Dauvergne, 419 E. Merle, San Leandro, Calif. 94577

[21] Appl. No.: 318,956

[22] Filed: Mar. 6, 1989

[51] Int. Cl.⁵ .............................................. G02C 13/00
[52] U.S. Cl. ...................................... 351/41; 351/175; 350/452
[58] Field of Search ........................ 351/41, 44, 45, 46, 351/47, 172, 171, 173, 175, 165; 350/452

[56] References Cited

U.S. PATENT DOCUMENTS

| | | | |
|---|---|---|---|
| 3,195,145 | 7/1965 | Tisher et al. | 351/172 |
| 3,628,854 | 12/1971 | Jampolsky | 351/47 |
| 3,744,882 | 7/1973 | Forster Jr. | 350/452 |

Primary Examiner—Paul M. Dzierzynski
Attorney, Agent, or Firm—Bielen, Peterson & Lampe

[57] ABSTRACT

A lenticular lens for eyewear and method for making the same, the lens being formed with a curved substrate having a plurality of lentoid impressions formed preferably on the inner surface of the substrate by a mold that includes curved, opposed mold pieces, one mold piece having an inset with parallel posts forming a composite face that is ground to a predetermined first curvature for optical correction, and then reoriented by sliding the posts to a predetermined second curvature complimentary to curvature of the opposed mold piece for imprinting thin lens blanks with multiple lentoid impressions for lightweight recreational eyewear.

6 Claims, 2 Drawing Sheets

LENTICULAR EYEWEAR AND METHOD OF FABRICATION

BACKGROUND OF THE INVENTION

This invention relates to prescription eyewear for users who have corrective prescriptions that cause eye glass lenses to be inordinately thick to accommodate the correction. While the use of lightweight plastics has provided some relief from the use of heavy plastic or glass lenses, the problem persists that many lenses for extreme visual correction are unusually thick resulting in an unattractive appearance. The thick appearance of a wearer's glasses can impact on the wearer's self image compounding the visual disability. Additionally, thick and heavy lenses can interfer with sports activities and other recreational activities where vision correction is needed. The eyewear lens of this invention comprises a lenticular lens principally designed as a health aid or for recreational eyewear, particularly eyewear for vision correction where thickness and weight are primary considerations.

It has been discovered that the imprinting of multiple miniature lenses on the surface of a lens blank, where the space between each mini-lens is minimized, will result in a user's mind ignoring the web-like interface between lenses when a user peers through a lens complex positioned close to the eye. Use of multiple miniature lenses having the extreme correction necessary for certain eye deficiencies, that would ordinarily result in overly thick conventional lenses, enables eyewear to be constructed with a thin profile that is consistent with conventional non-prescription sportswear lenses. To minimize distortion and to construct a lens that is as normal or attractive in appearance as conventional a lens, the miniature lenses are imprinted on a substrate having a curvature and thickness typically used for sunglasses. The geometric pattern selected for the lenses in the lens complex is based on aesthetic considerations since the appearance of the resulting eyewear is equally as important as its function. Constructing miniature lenses in an attractive pattern with a correct prescription curvature that can be imprinted on a naturally appearing lens substrate has presented substantial problems. The manufacture of a relatively inexpensive product that is available to individuals having different corrective prescriptions is also a problem. These problems have been overcome by the lenticular lens for corrective eyeglasses and the method of making the lens or lens segment for a two-piece lens as herein described.

The object of this invention is not to eliminate the use of conventional lenses with high corrections, but to create optional lightweight eyewear that is suitable for recreational use where sports activities or social situations make the optional eyewear desirable. The proposed eyewear is not considered a substitute for prescription lenses, but is an auxiliary item that is preferably tinted and styled to provide an attractive appearance which reinforces the confidence of the wearer.

SUMMARY OF THE INVENTION

The lenticular eyewear lens of this invention is designed for use in recreational style glasses primarily for individuals who require severe visual correction. The invented eyewear lens is a refractive lenticular lens comprised of a thin curved substrate of substantially uniform thickness, with a plurality of miniature lenses on preferably the inside or concave surface of the substrate. Each miniature lens is more accurately a lentoid impression or lenticule, which forms a lens in conjunction with the opposite surface of the substrate. The focal length of each "mini-lens" is dependent on the curvature of the mini-lens, the curvature of the opposite surface, and the refractive index of the particular material being used for the substrate or blank.

The term "substrate" is used in a general descriptive sense to define the structure on which the group of lenticules, or lenticular complex is formed. The "mini-lenses" are formed in a molding or stamping process when the lens blank is formed. The term "lens blank" refers to the lens before its perimeter is shaped for installation in a suitable frame or coupled to a primary lens in the altenate embodiment. The resulting lens blank then incorporates in its surface the lenticular complex. The lenticular complex is designed with an attractive pattern that masks the functional nature of the lenticular complex. This technique allows fabrication of a thin lens blank with a substantial correction that can be shaped to fit attractive eyeglasses ordinarily associated with recreational styles. Typically such styles combine large diameter lenses and lightweight frames.

In an alternate embodiment, the lens blank does not form the primary lens of the glasses, but a central segment of the lens blank is used in conjunction with a primary lens to form a compound lens designed for extreme corrections of myopia The term "lens segment" refers to the central portion of the lens blank adapted for use in a two-piece, compound lens.

The technique for forming lenticular lenses is particularly adapted to design of lightweight lenses for severe myopia or hyperopia. When severe correction of negative focus is required, a conventional lens is formed with an extremely thick outer periphery and a thin center. Such lenses are not only heavy but they cosmetically distort the wearer's natural eye features and are difficult to incorporate into a stylish frame. Similarly, severe correction of positive focus requires a lens with a thick center and thin periphery which again is difficult to stylishly frame. Frequently, frames are constricted in size to accommodate the smaller diameter lenses, often required for severe correction.

In adapting the lenticular lens to an eyeglass lens for correcting these vision conditions, the multiple lentoid impressions on the substrate are preferably incorporated on the inner or concave surface such that the eyewear lens has a substantially natural outer appearance. Each lentoid impression is of a diameter ranging, in general, between one hundred fifty thousandths and two hundred fifty thousandths of an inch, and each mini-lens formed is of substantially lesser dimension in thickness. Eyewear can therefore be fashioned having thin lenses that when tinted appear like conventional sunglasses.

The lenticular eyewear lens is fabricated utilizing a novel process that allows a particular focal correction to be incorporated in the lens or lens segment with a minimum expense. The lens blank is formed in a mold or die in an injection or heat-stamp process. Since the mold and die are essentially of the same construction, the molding process is described herein and it is to be understood that the process can be applied to the equivalent process of heat stamping of suitable sheet material composed of methylmethacrylate polymer or other suitable polymer.

As an example of the molding process for a simple lens, a mold is constructed with a first mold piece having a concave surface and a second, opposed mold piece having a complimentary convex surface. When proximately disposed, the convex surface is concentric with the concave surface to enable formation of a thin lens of uniform thickness without correction. Alternately, the mold surface may have different optical curvatures for more complex lens constructions.

One of the mold pieces, preferably the piece with the convex surface, has an inset which is a bundle of individual parallel posts with a composite face that forms a mold surface matrix. The surface imprints multiple individual lens structures or lenticules in a tight group or complex in the center of a molded lens blank. The overall curvature of the discontinuous face of the inset is adjusted to be substantially the same as the curvature of the mold piece, such that the thickness of the resulting lens blank is substantially uniform, with local variations caused by the curvature of individual lenticules. Before being installed in the mold piece the inset has its face first ground and polished as a unit to an optical curvature that, with the curvature of the mold piece opposite the face of the inset, will produce the required correction for the material used in the blank. The ground and polished composite face is then adjusted to conform to the curvature of the mold piece in which the inset is installed, with each post shifting relative to its neighbor. The ground and polished face of each post retains its proper optical curvature to produce the desired correction in the molded lens, but forms a surface matrix that is no longer smooth, but discontinuous or stepped in arrangement. Since the imprint of each post will form an individual lens that is visible, the cross section of the posts is selected to provide a pattern that is attractive. It has been found that posts with a hexagonal cross section provide the attractive pattern desired.

The optical curvature of the two mold pieces remains the same with changes in the optical curvature of the inset effecting the optical changes necessary for changes in corrective prescriptions. The inset is replaceable such that insets having different optical curvatures can be used in the same mold apparatus to produce different prescriptions in the lenses.

When the above described process is used to fabricate a lens segment for coupling to a base lens in constructing a compound lens, the mold configurations may differ, since the lenticular structure is impressed in the convex side of the lens segment. The lens segment is then coupled to the concave side of a corrective base lens with the lenticular structure facing the concave surface of the base lens. The space between the base lens and coupled lens segment is gas filled and the perimeter of the lens segment sealed to the base lens to entrap the gas and protect the discontinuous surface of the lenticular complex. By combining the corrections of the lens segment and the base lens, a compound lens can be formed that is lightweight, relatively thin and capable of correcting extreme myopia.

The lenticular lens and lenticular lens segment both have a central corrective lens portion encircled by the patterned lenticular complex. The central corrective portion is substantially larger than the individual lenticules making up the lenticular complex. These and other features of the lenticular lens and method of making the same are as described in greater detail hereinafter.

DETAILED DESCRIPTION OF THE INVENTION

Figure 3:
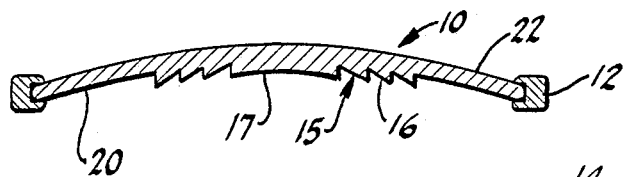
FIG. 3 is an enlarged cross sectional view taken along on the line 3—3 in FIG. 1.
Figure 2:
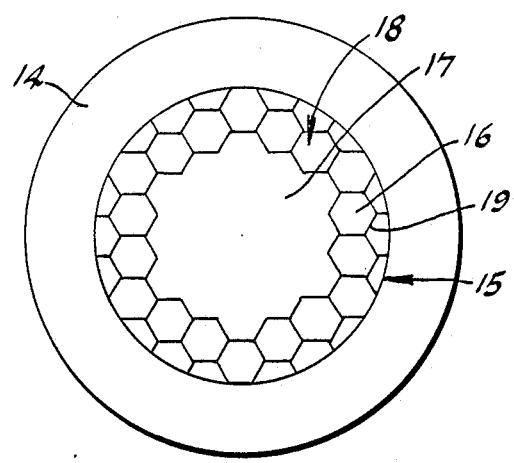
FIG. 2 is a back view of the lens blank from which the eye glass lens of FIG. 1 is formed.
Figure 1:
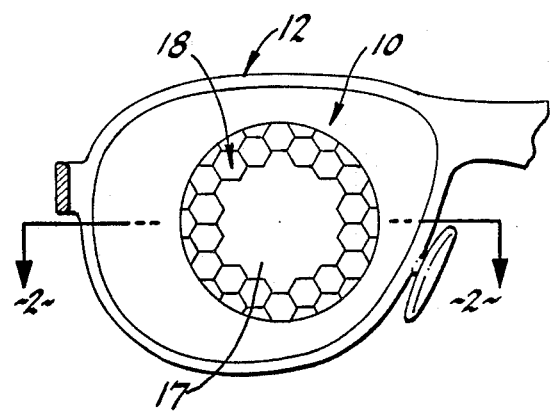
FIG. 1 is a partial view of the lenticular lens mounted in an eye glass frame.

The lenticular eyewear lens, designated generally by reference numeral 10 is mounted in a conventional recreational eyewear frame 12, shown in part in FIG. 1. The lenticular lens 10 is shaped from a thin lens blank 14, preferably of lightweight plastic, that has been cast, injection molded or heat stamped with a lenticular structure 15 centrally positioned in the blank as shown in FIG. 2. In the process described herein, the blank is fabricated of polycarbonate which can be molded to a uniform thickness with an imprinted surface structure that comprises a plurality of individual lentoid impressions or lenticules 16 arranged into a particular lenticular complex 18 as shown in FIG. 2. While the lenticular structure 15 in the cross sectional view of FIG. 3 is exaggerated in scale and is shown projecting from the inside surface 20 of the lens 10, it may be substantially flush with the surface or slightly recessed thereto.

The miniature lenticules 16 forming the lenticular complex, are arranged in a tight mosaic, as shown in FIG. 2. The lenticules 16 are of hexagonal configuration and when grouped, webs 19 are formed between adjacent lenticules. Each lenticule 16 cooperates with the curved outside surface 22 of the lens blank to form a miniature lens. The corrective value of each lens depends on the curvature of the outside surface 22 of the blank, the curvature of a particular lenticule 16, and the refractive index of the material. In the embodiment of FIG. 2, the center portion 17 of the lens blank 14 is substantially larger than a single hexagonal lenticule, curvature as any of the individual lenticules. In the simple embodiment shown, all of the lenticules 16 have the same curvature. More complex arrangements may be devised wherein the lenses formed by certain lenticules are of different corrective valves at different locations on the blank.

Figure 4:
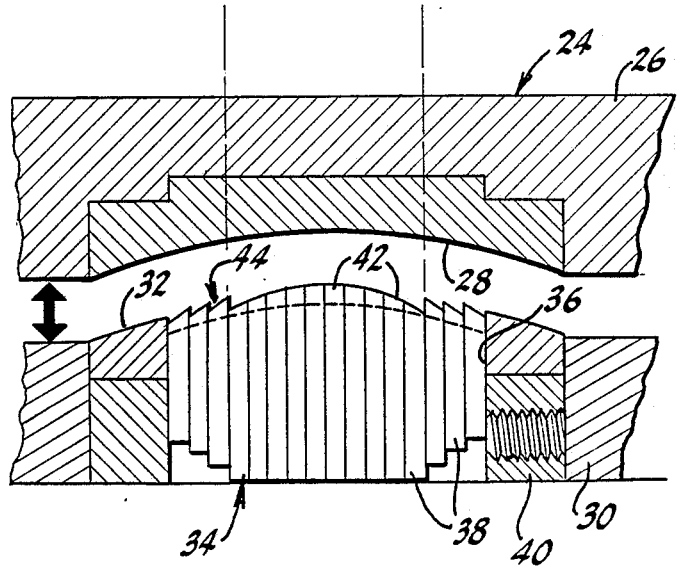
FIG. 4 is a cross sectional schematic of the molding process for forming the lenticular lens.

The lens blank 14 for the lenticular eyewear lens 10 is preferably formed in a mold 24, as shown in FIG. 4. The mold 24 has a first mold piece 26 with a ground and polished concave surface 28 and a second mold piece 30 with a complimentary ground and polished convex surface 32. The concave and convex surfaces are in the simplest system concentric when the mold pieces are positioned close together when forming a thin lens blank of substantially uniform thickness.

The second mold piece 30 has an inset 34 installed in a circular opening 36 in the central portion of the mold piece 30. The inset is constructed with a plurality of parallel posts 38 retained in a clamping collet 40. The ends 42 of the posts 38 form a surface matrix 44 which imprints or impresses the lenticular structure 15 in the concave surface of lens blanks formed between the mold pieces when the mold piece are proximately positioned.

Figure 5:
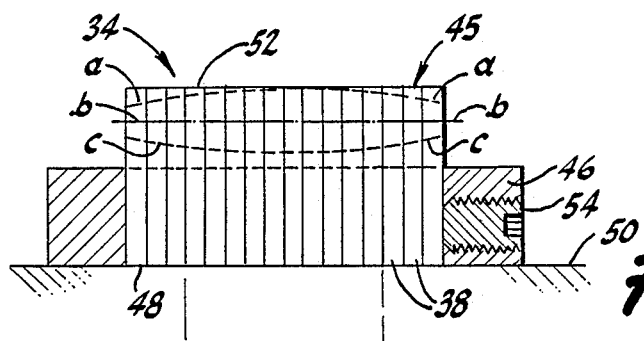
FIG. 5 is a cross sectional schematic view of the mold inset utilized in FIG. 4.

As shown in FIG. 5, the plurality of posts 38, are bundled together in a group and retained as a unit 45 by a grinding collet 46. The posts 38 have a flat base 48 which allows a relative position to be established among the posts 38 by aligning the post bases 48 on a flat surface 50. The opposite ends 52 of the posts are then ground as a unit to the select optical curvature that with the outside curvature of the proposed lens blank would theoretically impart the correct focal length to a lens of a particular material of given refractive index having the two designated surface curvatures. The bundled posts 38 are also ground as a unit with a perimeter shape, here cylindrical, to tightly fit as the inset in the opening 36 in the mold piece.

When the outside surface of the lens blank is maintained with a base curve of 5 or 6, which is common for conventional non-prescriptive lenses, the curvature of the ground posts for severe myopia will be convex as shown by line a-a, and, for severe hyperopia will be flat or concave as shown by lines b-b, and c-c. For purposes of this description a flat surface will be considered as having an optical curvature, the value of which is zero.

After grinding and polishing the tops of the posts 38 as a composite unit 45 to the desired corrective curvature, the posts of the group are shifted to a "structural" curvature to adjust to the inside design curvature of the prospective lens blank. "Structural curvature" is used to define the effective or average curvature of the discontinuous surface of the inset face after the posts have been shifted. In a simple embodiment this is accomplished by loosening a plurality of set screws 54 (one shown) which are arranged around the perimeter of the collet and manually shifting the posts to the positions desired. The posts shift in position by sliding relative to one another to form the surface matrix 44 that imparts the lenticular structure 15 to the lens blank.

In fabricating the lens blank 14 of FIG. 2, the posts forming the center portion 17 are fused together before grinding and polishing to eliminate any trace of webs that might otherwise form. The posts may be fused by brazing, soldering or bonding with epoxy or the like. The size of the central portion 17 is desired to be as large as possible, but is limited by the severity of the curvature required to produce the desired correction. To maintain the pleasing geometric pattern of the lenticular complex 18 the width of individual posts may be reduced to maintain the desirable border pattern shown. Additional concentric bands of hexagonal lenticules may be added to complete a circular lenticular structure including both the lenticules and center portion having a diameter of 33 millimeters. This diameter has been found to produce an area in an eyewear lens through which virtually all directed vision occurs.

Although the molding process was described for forming a lens blank having a lenticular structure that is formed in the surface of the eyewear the process is applicable to forming the lens segment for the compound lens.

Figure 6:
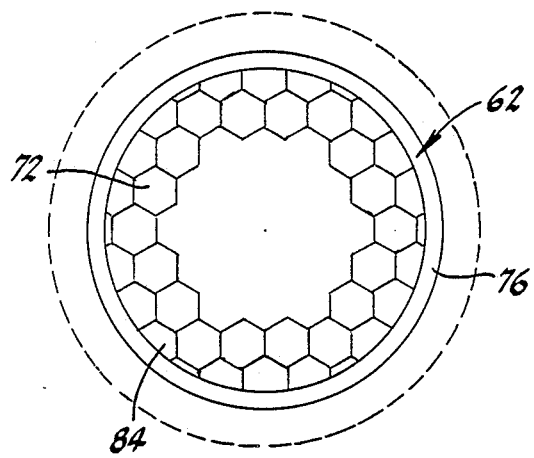
FIG. 6 is a back view of a lenticular lens segment used in compound lenses.

A compound lens designated generally by the reference numeral 60 is constructed with a lens segment 62 that is coupled to a conventional corrective lens 64 as described with reference to FIGS. 6-10. As shown in FIG. 6, the lens segment 62 has been formed in a mold and trimmed from a lens blank having an original diameter as shown in dotted line. As shown in FIGS. 7-10 the lens segment 62 can have a variety of different cross sections depending on the corrective strength to be obtained by the compound lens and the curvature of the concave surface 66 of the corrective lens 64 to which the lens segment is mated. The compound lens is designed to correct for severe myopia by an eyewear lens that has a convex outer surface 68 instead of the customary flat surface. The compound lens enables the corrective power of two lenses to be combined to achieve focal corrections in diopters of minus 10 to minus 22 or greater.

The lens segment 62 has one side 70 with or without optical curvature and an opposite side 74 with a conventional optical curvature. On the first side 70 the lens segment is formed with a ridge 76 around its perimeter. The lens segment has been trimmed from the full size blank as shown in dotted line in FIG. 6.

Figure 7:
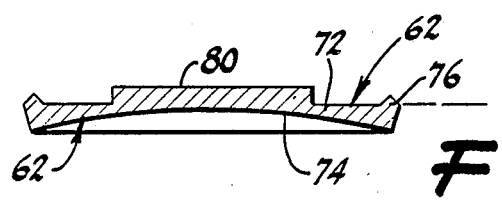
FIG. 7 is a cross sectional view of the lens segment of FIG. 6 taken on the lines 7—7 in FIG. 6.
Figure 8:
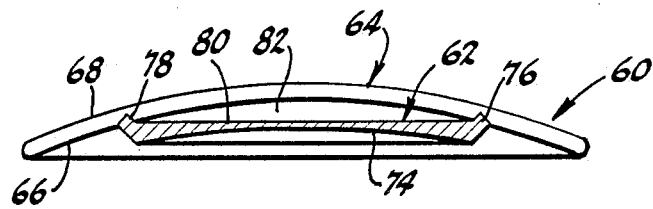
FIG. 8 is a cross sectional view of a compound lens.
Figure 9:
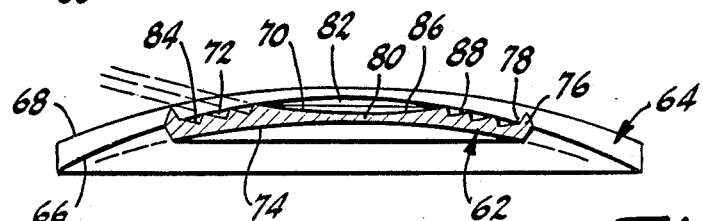
FIG. 9 is a cross sectional view of an alternate embodiment of the compound lens.
Figure 10:
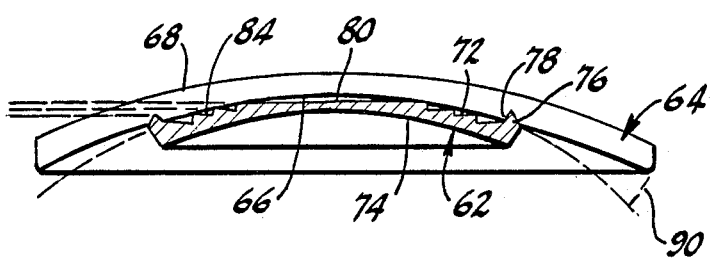
FIG. 10 is a cross sectional view of a further embodiment of the compound lens.

Inward of the perimeter ridge in most embodiments is a lenticular complex 72 and a central portion 80. The lens segment 62 is mated to the concave surface 66 of the corrective lens 64 as shown in FIGS. 8, 9 and 10. The perimeter ridge 76 is embedded in a groove 78 in the concave surface 66 of the corrective lens such that a sealed space 82 is formed between the two lenses which are fused together. Where the first side of the lens segment is flat as shown in FIGS. 7, 8 and 10 the advantage in corrective power is due entirely to the opposite sides 74 of the lens segment and the correction of the base lens 64.

To substantially increase the power of the lens, the optical curvature of the concave surface 66 of the base lens 64 can be reduced in its radius as shown in FIGS. 9 and 10. To provide a commensurate radius to the lens segment 62 the side 70 that mates with the concave surface 66 of the base lens 64 includes a stepped lenticular structure 84 as shown in FIGS. 7, 9 and 10. The lenticular structure 84 is formed by the ends 42 of the posts 38 in the mold inset 34 in the process previously described. Where the lenticular structure 84 comprises lenticules with a flat surface as shown for the lens segment of FIGS. 7 and 10, the corrective power of the lens segment 62 is developed entirely by the optical curvature of the opposite side 74. The corrective power is then combined with the corrective power of the base lens 64 to produce the resultant corrective power of the compound lens.

In the embodiment of FIG. 9, the side 70 on which the lenticular structure 84 is incorporated the surface is constructed of a concave center portion 86 with concave, stepped lenticules 88. The concave center portion 86 and concave lenticules 88 combine with the concave surface of the opposite side 74 to increase the power of the lens segment 62. Again, the combined focal power of the lens segment and base lens determines the resultant power of the compound lens.

In the embodiment of FIG. 10, the base lens 64 has a concave surface 66 that if continued beyond the perimeter of the lens segment 62 would result in a thick outer portion 90 as shown in dotted line. Since the outer portion contributes little to corrected vision for severe myopics, the portion is trimmed in thickness as shown.

The patterned lenticular complex 72 developed by the displaced posts 38 in the inset 34 during the molding process is protected from dirt and damage by being trapped in the innerspace between the base lens 64 and the lens segment 62. The space 82 between the two lenses is filled with dry air or other gas to provide refraction of the coupled lenses. FIGS. 7–10 illustrate various embodiments of the lens segment and compound lens.

While the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A molded lenticular lens for use in eyeglasses having a styled frame comprising:
    a thin lens blank having a first surface with a continuous optical curvature and a second surface which optically coacts with the first surface, the second surface having an outer perimeter portion without optical correction, a middle portion having a plurality of hexagonally configured lenticles forming a patterned lenticular complex, each lenticule having an optical correction, and said second surface further including a center portion having an optical correction, the lenticular complex being arranged around the center portion, said plurality of hexagonally configured lenticules forming an irregular border around said center portion of said second surface.

2. The lens of claim 1 wherein the optical correction of the center portion is the same as the optical correction of the lenticules.

3. The lens of claim 1 wherein the geometrically configured lenticules and the center portion comprise displaced segments of a continuous optical curvature.

4. The lens of claim 1 wherein the center portion is formed from a plurality of lenticules with a common continuous surface and the middle portion is formed of lenticules stepped from the center portion.

5. The lens of claim 1 wherein the outer perimeter portion has a shaped perimeter to couple with the eyeglass frame.

6. The lens of claim 1 wherein the outer perimeter portion is trimmed to form a lens segment the lens segment being adapted for coupling to a concave surface of an eyeglass lens to form a compound lens.

* * * * *